United States Patent [19]

Tsuchiya et al.

[11] Patent Number: 5,137,955

[45] Date of Patent: Aug. 11, 1992

[54] PROPYLENE POLYMER FILM

[75] Inventors: Katsuhiro Tsuchiya, Kusatsu; Kenji Takuwa, Takatsuki; Katsuya Ogawa, Otsu, all of Japan

[73] Assignee: Toray Industries, Inc., Tokyo, Japan

[21] Appl. No.: 494,404

[22] Filed: Mar. 16, 1990

[30] Foreign Application Priority Data

Jun. 6, 1989 [JP] Japan ................... 1-143862

[51] Int. Cl.⁵ .............................................. C08K 5/10
[52] U.S. Cl. ................... 524/310; 524/313; 524/320; 524/584; 524/493
[58] Field of Search ............... 524/313, 310, 320, 506, 524/493

[56] References Cited

U.S. PATENT DOCUMENTS

| | | | |
|---|---|---|---|
| 4,189,420 | 2/1980 | Sugimoto et al. | 526/6 |
| 4,230,767 | 10/1980 | Isaka et al. | 428/910 |
| 4,486,552 | 12/1984 | Niemann | 524/313 |
| 4,535,113 | 8/1985 | Foster et al. | 524/262 |
| 4,725,466 | 2/1988 | Crass et al. | 428/35 |
| 4,769,418 | 9/1988 | Mizuno et al. | 525/106 |
| 4,966,933 | 10/1990 | Kawakami et al. | 524/506 |

FOREIGN PATENT DOCUMENTS

| | | |
|---|---|---|
| 0158140 | 10/1985 | European Pat. Off. |
| 0210750 | 2/1987 | European Pat. Off. |
| 0242055 | 10/1987 | European Pat. Off. |
| 53-54248 | 5/1978 | Japan |
| 54-36359 | 3/1979 | Japan |
| 60-57459 | 12/1985 | Japan |
| 61-36866 | 8/1986 | Japan |
| 62-10141 | 1/1987 | Japan |
| 62-232448 | 10/1987 | Japan |
| 62-233248 | 10/1987 | Japan |
| 63-105040 | 5/1988 | Japan |
| 63-182212 | 7/1988 | Japan |
| 63-58170 | 11/1988 | Japan |
| 2201407 | 9/1988 | United Kingdom |

*Primary Examiner*—John C. Bleutge
*Assistant Examiner*—Mark Sweet
*Attorney, Agent, or Firm*—Birch, Stewart, Kolasch & Birch

[57] ABSTRACT

A propylene polymer film is described which is composed of a composition comprising 100 parts by weight of a propylene polymer, 0.01 to 0.5 part by weight of a fine spherical silica particle and 0.3 to 5.0 parts by weight of hydroxy-fatty acid glyceride. A laminate film including a layer comprised of the above composition is also described. The film has an excellent transparency, gloss, slipperiness and adhesiveness, as well as a good adaptability to vacuum deposition.

20 Claims, No Drawings

PROPYLENE POLYMER FILM

BACKGROUND OF THE INVENTION

1. Field of the Invention

The present invention relates to a propylene polymer film. More particularly, it relates to a propylene polymer film having an excellent transparency, gloss, slipperiness, adhesiveness and adaptability to vacuum deposition, which is suitable for use as packaging material after vacuum deposition.

2. Description of Related Art

Many proposals have been made to improve the transparency and slipperiness of a propylene polymer film.

For example, Japanese Unexamined Patent Publication No. 63-105040 discloses a thermoplastic resin film containing inactive particles having a spherical shape and a pore volume of 0.1 to 3.0 milliliter per gram, and the film has a good transparency and handling property.

Japanese Examined Patent Publication No. 63-58170 discloses a polypropylene film containing a fine-powdered silica having an apparent specific gravity of 0.1 to 0.2 and a specific surface area of not more than 150 $m^2/g$, the film has a good transparency, slipperiness and antiblocking property.

Japanese Examined Patent Publication No. 61-36866 discloses a polymer film containing a fine-powdered aluminosilicate consisting of cubic shaped primary particles, and the film has a good slipperiness and antiblocking property.

U.S. Pat. No. 4,230,767 discloses a packaging material having an excellent seal packaging property, which comprises a base layer consisting of a stretched film made of a polymer composition comprising a propylene polymer and a surface layer consisting of a stretched film made of a polymeric mixture comprising a polymer blend, said polymer blend comprising a copolymer of ethylene and propylene and a copolymer of butene and any other polymerizable monomer. And it discloses that inorganic additives such as silica may be incorporated into the polymer composition as an anti-blocking agent and that there may be also used monoglycerides of fatty acid esters as an antistatic agent.

Japanese Unexamined Patent Publication No. 62-10141 discloses a process to make a porous film or sheet of a composition comprising a polyolefin resin, a filler, and triglyceride. And it discloses that inorganic substances such as silica can be used as a filler. But this porous film or sheet has a moisture permeability, and is preferably used for clothing material, medical supplies, a filter and so on.

Japanese Examined Patent Publication No. 60-57459 discloses a composition comprising a polyolefin resin and a glyceride of acylated 12-hydroxyoleic acid or 12-hydroxysrearic acid, which can be used to make a stretch film having a good softness.

Japanese Unexamined Patent Publication No. 53-54248 and Japanese Unexamined Patent Publication No. 54-36359 discloses a polyolefin resin film containing an glyceride, one acyl group of which has 2 to 6 carbon atoms and another acyl group of which has 8 to 22 carbon atoms, and this film has a good transparency.

European Patent Publication No. 0 210 750 A3 discloses a film-forming propylene polymer composition suitable for preparing a heat sealable polypropylene film and containing a propylene polymer and about 9 to about 14% by weight of a hard resin, and optionally a hydrocarbon wax, characterized in that the composition comprises about 86 to about 92% by weight of polypropylene, about 9 to about 14% by weight of a hard resin, and about 0.05 to about 0.8%, based on the weight of the composition, of a monoglyceride, a diglyceride, or a mixture of mono- and diglycerides, of behenic acid. The obtained film has improved antistatic properties.

European Patent Publication No. 0 242 055 A2 (Japanese Unexamined Patent Publication No. 62-215646), Japanese Unexamined Patent Publication No. 62-232448 and Japanese Unexamined Patent Publication No. 62-233248 discloses a propylene polymer film composed of a composition comprising a crystalline propylene polymer and a non-meltable crosslinked silicone resin powder having a means particle diameter of 0.5 to 7 microns, and the film has especially good transparency and exhibits a marked improvement in antiblocking property, bag opennability, slipperiness and appearance.

U.S. Pat. No. 4,725,466 discloses a non-sealable biaxially oriented multi-layer polypropylene film comprising a polypropylene homopolymer base layer and at least one covering layer, said covering layer comprising an aliphatic amine, a polydialkylsiloxane, a platelet-shaped inorganic pigment and a propylene homopolymer. The film has good anti-blocking and slip properties, good optical properties, good antistatic properties, and a high scratch resistance, and is used as a laminating film, an interleaving film or a metallizable film.

European Patent Publication No. 0 158 140 A3 discloses olefin polymer compositions containing silicone additives which can be extruded through relatively narrow die gaps at commercial extrusion rates to provide film material characterized by improved mechanical and optical properties.

And it is known that an organic fatty acid amide such as oleic acid amide, stearic acid amide or erucic acid amide is incorporated in a propylene polymer film to improve the slipperiness of the film.

The above-mentioned conventional propylene polymer films have a good transparency or a good slipperiness, but during the operation conducted after vacuum deposition on the film, defects or discharge traces are formed on the vacuum deposition layer by the discharge treatment, or small pinholes are formed or blocking is caused, resulting in peeling or wrinkling of the vacuum deposition layer. Namely, these films does not have a good adaptability to vacuum deposition.

SUMMARY OF THE INVENTION

Therefore, an object of the present invention is to solve the foregoing problems and provide a propylene polymer film having an excellent transparency, gloss, slipperiness, adhesiveness, and adaptability to vacuum deposition.

In accordance with the present invention, there is provided a propylene polymer film composed of a composition comprising 100 parts by weight of a propylene polymer, 0.01 to 0.5 parts by weight of a fine spherical silica particle and 0.3 to 5.0 parts by weight of hydroxy-fatty acid glyceride.

Furthermore, in accordance with the present invention, there is provided a laminate film including a layer comprised of the above-mentioned composition.

DESCRIPTION OF THE PREFERRED EMBODIMENTS

As the propylene polymer used in the present invention, there can be mentioned a propylene homopolymer, a random, block or graft copolymer of propylene with other α-olefin such as ethylene, butene, 4-methylpentene or octene, an unsaturated carboxylic acid or its derivative such as acrylic acid or maleic anhydride, and a mixture thereof. Preferably the isotactic index of the propylene polymer is at least 50, especially at least 80. For a propylene homopolymer, it is especially preferred that the isotactic index is at least 95% and the intrinsic viscosity $[\eta]$ is 1.2 to 2.5 dl/g. As preferred examples of the propylene polymer, there can be mentioned an ethylene/propylene copolymer having an ethylene content of 1 to 8% by weight, an ethylene/propylene/butene-1 copolymer having an ethylene content of 0.5 to 5% by weight and a butene-1 content of 3 to 25% by weight, a propylene/butene-1 copolymer having a butene-1 content of 3 to 25% by weight, and a mixture of an ethylene/propylene copolymer and a propylene/butene-1 copolymer, having an ethylene content of 0.5 to 5% by weight and a butene-1 content of 2 to 15% by weight. For a copolymer, preferably the propylene content is at least 80% by weight. For a copolymer mixture, it is not absolutely necessary that the propylene content should be at least 80% by weight in all of the copolymers, but preferably the propylene content in the entire mixture is at least 80% by weight.

The fine spherical silica particle used in the present invention can be prepared by various methods such as a method in which a spray of silica hydrosol or silica-alumina sol is brought into collision with a stream of air, hydrolysis of an organic silicic acid compound, a method in which glass ceramic material is spherical and sintered, and a method disclosed in Japanese Unexamined Patent Publication No. 63-182212. The fine spherical silica particle is mainly composed of silicon dioxide ($SiO_2$) and can contain, for example, aluminum oxide ($Al_2O_3$), sodium oxide ($Na_2O$) and so forth. The content of silicon dioxide is preferably at least 70% by weight, especially at least 80% by weight from a view point of transparency. The fine particle of silica used in the present invention is spherical. The term "spherical" means that the shape factor R represented by the following formula is in the range of from 0.0650 to 0.0795:

$$R = A/P^2$$

where A represents the projection cross-sectional area of the fine particle of silica and P represents the circumferential length of the projection cross-section of the fine particle of silica. When the shape factor R fails to fall within the range specified above, transparency, lustre, slipperiness and evaporation deposition characteristics are rendered unsatisfactory.

The hydroxy-fatty acid glyceride is a hydroxylated product of a mono-, di- or tri-glyceride of a fatty acid having 8 to 22 carbon atoms. For example, a product obtained by hydrogenation of a natural castor oil is included in the hydroxy-fatty acid glyceride. A preferably hydroxy-fatty acid glyceride is the one in which the hydrogen atom bonded to the 12th carbon atom counted from the carbon atom of carbonyl is substituted by OH. The glyceride is preferably a triglyceride. Glyceryl tri-12-hydroxystearate is most preferred as the hydroxy-fatty acid glyceride.

In the present invention, both the fine spherical silica particle and hydroxy-fatty acid glyceride must be incorporated in the specific amount. More specifically, the fine spherical silica particle is incorporated in an amount of 0.01 to 0.5 part by weight, preferably 0.02 to 0.35 part by weight, per 100 parts by weight of the propylene polymer, and the hydroxy-fatty acid glyceride is incorporated in an amount of 0.3 to 5.0 parts by weight, preferably 0.5 to 3.0 parts by weight, per 100 parts by weight of the propylene polymer. If the amount of the fine spherical silica particle is smaller than 0.01 part by weight, the slipperiness and adaptability to vacuum deposition are not satisfactory, and if the amount of the fine spherical silica particle is larger than 0.5 part by weight, the transparency, gloss and adaptability to vacuum deposition are not satisfactory. If the amount of the hydroxy-fatty acid glyceride is smaller than 0.3 part by weight, the slipperiness and adaptability to vacuum deposition are not satisfactory, and if the amount of the hydroxy-fatty acid glyceride is larger than 5.0 parts by weight, adhesiveness, gloss and adaptability to vacuum deposition are not satisfactory.

The propylene polymer film of the present invention is obtained by shaping the above-mentioned composition, and the film may be any of an undrawn film, a uniaxially drawn film, a biaxially drawn film, a cast film, a roll-drawn film, a tubular biaxially drawn film, a tenter biaxially drawn film, a single-layered film and a laminate film. A laminate film is preferred because various characteristics can be imparted.

In the case of the laminate film, the thickness of the laminated layer is 0.5 to 20 μm, preferably 1 to 10 μm, and the thickness of the base layer is 5 to 50 μm, preferably 10 to 20 μm. As the lamination method, there can be mentioned a co-extrusion method, a method in which lamination is effected on a uniaxial drawn film, and a method in which biaxially drawn films are bonded. A two-layer structure of laminated layer/base layer and a three-layer structure of laminate layer/base layer/laminated layer are preferred as the laminate structure. Preferably, a layer [layer (A)] comprising both the fine spherical silica particle and the hydroxy-fatty acid glyceride is at least one of the base layer and the laminated layer. Most preferably, the laminate film is a two-layer film comprising the layer (A) as the laminated layer and the other layer [layer (B)] as the base layer, which is composed of 100 parts by weight of a propylene polymer and 0.005 to 0.2 part by weight of a fine spherical silica particle.

To obtain a satisfactory transparency, gloss, slipperiness and adhesiveness, preferably the average diameter of the fine spherical silica particle is 1.0 to 7.0 μm. For the above-mentioned two-layer film, it is especially preferable that the average diameter $d_A$ of the fine spherical silica particle in the layer (A) and the average diameter $d_B$ of the fine spherical silica particle in the layer (B) satisfy the requirements of $d_A \geq d_B$, 1.0 μm $\leq d_A \leq$ 7.0 μm and 0.5 μm $\leq d_B \leq$ 5.0 μm.

For the two-layer film, preferably the atomic construction ratio within 10 nm thickness of the outer surface layer on the side of the layer (B) is such that the oxygen atom number/carbon atom number ratio is in the range of from 0.10 to 0.35 and the nitrogen atom number/carbon atom number ratio is in the range of from 0.005 to 0.05, because the adhesiveness improved when vacuum deposition of a metal or printing is effected on the surface of the layer (B) of the two-layer film.

A co-extruded biaxially drawn two-layer film comprising a laminated layer [layer (A)] comprising an ethylene/propylene copolymer, a propylene/butene-1 copolymer, a mixture of both the copolymers or an ethylene/propylene/butene-1 copolymer, and incorporated therein a fine spherical silica particle and a hydroxy-fatty acid glyceride, and a base layer [layer (B)] comprising a propylene homopolymer, that is, isotactic polypropylene, incorporated therein a fine spherical silica particle, and having a vacuum deposition of a metal such as aluminum, zinc or an alloy having a thickness of 10 to 500 nm, namely, an optical density of from 0.5 to 5.0 formed on the surface of the base layer, is most preferred as the film construction in the present invention. In this structure, the laminated layer side has a good heat sealability and a vacuum-deposited metal layer on the base layer side is effective for bonding and printing, and this structure is valuable for use as an oxygen- or moisture-barrier film and as a vacuum-deposited packaging film having an excellent appearance vacuum-deposited printing.

Inorganic particles of calcium carbonate and kaolin; organic substances such as oleic amide, stearic amide, erucic amide, stearic monoglyceride, stearic triglyceride, hydroxy-fatty acid amines, sodium salts of amino-fatty acids, betaine compounds and N,N-bishydroxyethylalkylamine, and known nucleating agents; slipping agents, antistatic agents, antioxidants, heat stabilizers and ultraviolet absorbers can be incorporated in the composition constituting the propylene polymer film of the present invention in amounts not hindering the attainment of the objects of the present invention, generally in amounts smaller than 1% by weight, preferably in amounts smaller than 0.6% by weight.

An example of the process for preparing the propylene polymer film of the present invention will now be described, although the process that can be adopted in the present invention is not limited to the process described below.

First, a composition comprising a propylene polymer and necessary additives is supplied to one extruder, (or at least two extruders in the case of co-extrusion lamination), and composition is melt-extruded at a temperature between 220° and 290° C. and the extrudate is cooled and solidified into a sheet in contact with a cooling drum which is maintained at a temperature between 15° and 85° C. When the film is used in the form of an undrawn or cast film, the film obtained at this stage is used. Then, the sheet is introduced into contact with pre-heated rolls heated to a temperature between 110° and 150° C. and drawn in the longitudinal direction at a draw ratio of 3 to 7. When the film is used in the form of a uniaxially drawn film or roll-drawn film, the film obtained at this stage is used. The uniaxially drawn film is introduced to a tenter in an atmosphere maintained at 150° to 170° C. and drawn in the lateral direction at a draw ratio of 5 to 13, and if necessary, the drawn film is relaxed and thermally set at a temperature between 140° and 165° C. When the film is used in the form of a biaxially drawn film, the film obtained at this stage is used.

Furthermore, there can be adopted a process in which a composition is melt-extruded from another extruder onto the surface of the uniaxially drawn film to form a laminate film.

In view of the point described below, preferably a corona discharge treatment is conducted on one surface of the thus-obtained biaxially drawn film or the surface of the base layer for a co-extruded two-layer film. When printing or vacuum deposition of a metal is effected on the treated surface, adhesion to printing or vacuum deposition is advantageously improved. The corona discharge treatment may be carried out in air, but preferably the corona discharge treatment is carried out in an atmosphere composed mainly of carbon dioxide gas.

The vacuum deposition process is not particularly limited, and a batchwise vacuum deposition process and air/air continuous vacuum deposition process can be adopted, and such means as electric heating, ion beaming, sputtering and ion plating used.

The propylene polymer film of the present invention is particularly useful as a metal-deposited packaging film, though it can be used for ordinary packaging purposes. Where a polymer having a low melting point is used as the propylene polymer of the laminated layer, this layer can act as a heat-sealable layer. The propylene polymer film of the present invention is applied where a vinylidene chloride resin is coated on the corona discharge-treated surface or a printing ink is applied to the corona discharge-treated surface, where a polyolefin is extrusion-laminated, or where another substrate, for example, an undrawn or uniaxially or biaxially drawn film of polyethylene, polypropylene, nylon or polyester having a thickness of about 3 to 50 $\mu$m, a cellophane sheet or a vinylidene chloride resin-coated cellophane sheet is bonded to the propylene polymer film. Most preferably, vacuum deposition is effected on the propylene polymer film of the present invention and the vacuum-deposited film used as a heat-sealable package for which moisture-barrier and oxygen-barrier effects and an excellent appearance are required, for example, a package for a snack or the like.

The methods adopted for measuring the characteristic values and evaluating the effects in the present invention will now be described.

(1) Haze (transparency)

The haze determined according to JIS K 6714. A smaller value indicates a higher transparency.

(2) Gloss (lustre)

The gloss was determined at 60°—60° according to JIS K 8471. A larger value indicates a better gloss.

(3) Friction coefficient (slipperiness)

According to ASTM D 1894, the static friction coefficient $\mu_s$ and dynamic friction coefficient $\mu_d$ were determined. A smaller value indicates a better slipperiness.

(4) Aluminum vacuum deposition adhesion index (adhesive force)

Aluminum was vacuum-deposited in a thickness corresponding to an optical density of 2.0 on the corona discharge-treated surface of the film, and the vacuum deposition layer was peeled by using an adhesive cellophane tape ("Celotape" supplied by Nichiban K. K.) and the area of the aluminum-adhering portion left in the film was determined by an image treatment. The adhesion index was judged by the following standard.

| Aluminum-Adhering Area | Adhesion Index |
| --- | --- |
| At least 95% | 5 |
| At least 90% but less than 95% | 4 |
| At least 75% but less than 90% | 3 |
| At least 50% but less than 75% | 2 |

| Aluminum-Adhering Area | Adhesion Index |
| --- | --- |
| less than 50% | 1 |

A higher adhesion index indicates a better adhesive force.

(5) Adaptability to vacuum deposition

Aluminum was vacuum-deposited in a thickness corresponding to an optical density of 2.0 at a rate of 300 m/min on the corona discharge-treated surface of a film having a width of 1 m and a length of 10,000 m, and the film was wound back at a rate of 300 m/min. Then, the film was rewound at a rate of 20 m/min and the following defects on the vacuum-deposited surface were checked under a fluorescent lamp.
(a) Defects in the vacuum deposition layer by discharge
(b) Discharge traces
(c) Pinholes
(d) Defects in the vacuum deposition layer by blocking
(e) Wrinkles The adaptability to vacuum deposition was evaluated by the following scale.
Good: none of the above defects over a length of 10,000 m
Poor: one or more of the above defects over a length of 10,000 m Of course, mark "Good" indicates a better adaptability to vacuum deposition.

(6) Average diameter d and shape factor R

The average diameter d of the fine spherical silica particle was conducted by viewing and photographing 100 particles of silica powder or of silica in the film through an electron microscope (Model S-510 supplied by Hitachi, Ltd.) and determining the average diameter through an image analyzing processing by means of "Quam timet" 720 supplied by Image Analyzing Computer, Inc.

The shape factor R was determined by measuring the projection cross-sectional area A and the peripheral lengths P of 100 particles as in the case of measurement of the average diameter, and dividing the projection cross-sectional area A by the square of the peripheral length $P(R=A/P^2)$.

When the particle has a completely spherical form, the shape factor R is given as follows:

$$R = \pi r^2/(2\pi r)^2 = 1/(4\pi) = 0.07958$$

where r represents the radius of the particle.

When the projection cross-section of the particle is square, the shape factor R is calculated as follows:

$$R = L^2/(4L)^2 = 1/16 = 0.0625$$

where L represents the length of each side of the square.

(7) Amount incorporated

The amount incorporated of the hydroxy-fatty acid glyceride in the film was determined in the following manner. First, the film was subjected to Soxhlet reflux extraction with chloroform and the extract was fractionated by a liquid chromatography (Model LC-908 supplied by Nippon Bunseki Kogyo), the absorbance was measured by a Fourier transformation infrared absorption spectroscopy (Model FT-IR-FTS-50 supplied by Digilab Co.), and the amount incorporated was determined from the absorbance.

(8) Atomic construction ratio

With respect to the treated surface of the film, the ESCA measurement of the 1s orbit was carried out by using $MgK_{\alpha 1,2}$ ray as the exciting X-ray at a photoelectron emission angle of 90° while adjusting the bonding energy of $C_{1s}$ main peak to 284.6 eV in ESCA Model 750 supplied by SHIMADZU CORPORATION, and the ratio of the number of oxygen atoms to the number of carbon atoms (O/C) and the ratio of the number of nitrogen atoms to the number of carbon atoms (N/C) were calculated.

The present invention will now be described in detail with reference to the following examples.

EXAMPLE 1

A propylene homopolymer (isotactic index=97.5%, $[\eta]=2.3$) containing a fine spherical silica particle having a shape factor R of 0.078 and an average diameter of 2.0 μm (Silton AMT-Silica 200B supplied by Mizusawa Industrial Chemicals Co., Ltd.) and a hydroxy-fatty acid glyceride (glyceryl tri-12-hydroxystearate, Rikemal TG-12 supplied by Riken Vitamin K.K.) incorporated in the amounts shown in Table 1 was supplied to one extruder and melt-extruded at 275° C., and the extrudate was cast-wound on a cooling drum maintained at 45° C. to form an undrawn sheet. The undrawn sheet was guided to pre-heating rolls and drawn at a draw ratio of 5 in the longitudinal direction under heating at 138° C. The drawn sheet was guided to a tenter and drawn at a draw ratio of 9 in the lateral direction in an atmosphere maintained at 162° C., and thermal setting was carried out at 150° C. to obtain a biaxially drawn single-layer polypropylene film having a thickness of 20 μm. One surface of the film was subjected to the corona discharge treatment in an atmosphere composed mainly of carbon dioxide gas to form an activated surface having a surface tension of 42 dyne/cm as determined by the method of JIS K-6768. Then, aluminum was vacuum-deposited in a thickness corresponding to an optical density of 2.0 on the activated surface under vacuum.

COMPARATIVE EXAMPLES 1 AND 2

The procedures of Example 1 were repeated in the same manner except that the amounts of the additives incorporated were changed as shown in Table 1.

COMPARATIVE EXAMPLE 3

The procedures of Example 1 were repeated in the same manner except that a fine silica particle having a shape factor R of 0.0625 and an average particle diameter of 2.0 μm (Silton AMT-Silica 200A supplied by Mizusawa Industrial Chemicals Co., Ltd.) was used instead of the fine spherical silica particle (Silton AMT-Silica 200B).

EXAMPLE 2

A propylene homopolymer (the same as used in Example 1) containing 0.05 part by weight of sodium aluminosilicate (zeolite) having an average particle diameter of 3.5 μm (Silton P supplied by Mizusawa Industrial Chemicals Co., Ltd.) was supplied to one extruder [base layer; layer (B)], and an ethylene/propylene/butene-1 copolymer having an ethylene content of 3.0% and a butene-1 content of 5.0% and containing a fine spherical silica particle having a shape factor R of 0.078 and an average particle diameter of 4.5 μm (Silton AMT-Silica 450B supplied by Mizusawa Industrial Chemicals Co., Ltd.) and a hydroxy-fatty acid glyceride (glyceryl tri-12-hydroxystearate, Rikemal TG-12 supplied by Riken Vitamin K.K.) incorporated in the amounts shown in Table 1 was supplied to another extruder [laminated layer; layer (A)], and both compositions were co-extruded at 275° C. The extrudate was biaxially drawn in the same manner as described in Example 1 to obtain an A/B two-layer laminate film (A: ethylene/propylene/butene-1 copolymer layer, B: propylene homopolymer layer). The total film thickness was 20 μm, and the thicknesses of the laminated layer [layer (A)] and the thicknesses of the base layer [layer (B)] were 3.5 μm and 16.5 μm, respectively. The surface of the layer (B) was subjected to the corona discharge treatment in the same manner as described in Example 1 to form an activated surface having a surface tension of 42 dyne/cm, and aluminum was vacuum-deposited on the treated surface in the same manner as described in Example 1.

EXAMPLE 3

A propylene homopolymer (the same as in Example 1) containing 0.02 part by weight of a fine spherical silica particle having a shape factor R of 0.078 and an average particle diameter of 2.0 μm (Silton AMT-Silica 200B supplied by Mizusawa Industrial Chemicals Co., Ltd.) was supplied to one extruder [base layer; layer (B)], and an ethylene/propylene/butene-1 copolymer (the same as in Example 2) containing a fine spherical silica particle having a shape factor R of 0.078 and an average particle diameter of 4.5 μm (Silton AMT-Silica 450B supplied by Mizusawa Industrial Chemicals Co., Ltd.) and a hydroxy-fatty acid glyceride (glyceryl tri-12-hydroxystearate, Rikemal TG-12 supplied by Riken Vitamin K.K.) incorporated in the amounts shown in Table 1 was supplied to another extruder [laminated layer; layer (A)]. Co-extrusion, casting and biaxial drawing were carried out in the same manner as described in Example 2 to obtain a two-layer film comprising a laminated layer [layer (A)] having a thickness of 3.5 μm and a base layer [layer (B)] having a thickness of 14 μm. The surface on the side of the layer (B) was subjected to the corona discharge treatment in the same manner as described in Example 1 to form an activated surface having a surface tension of 42 dyne/cm. Aluminum was vacuum-deposited on the treated surface in the same manner as in Example 1.

COMPARATIVE EXAMPLE 4

The procedures of Example 3 were repeated in the same manner except that the amounts of the hydroxy-fatty acid glyceride (glyceryl tri-12-hydroxystearate) incorporated in the composition of the laminated layer was reduced to 0.1 part by weight.

COMPARATIVE EXAMPLE 5

The procedures of Example 3 were repeated in the same manner except that 0.3 part by weight of a fine silica particle having a shape factor R of 0.0625 and an average particle diameter of 2.0 μm (Silton AMT-Silica 200A supplied by Mizusawa Industrial Chemicals Co., Ltd.) was used instead of the fine spherical silica particle (Silton AMT-Silica 200B) in the composition of the laminated layer [layer (A)].

COMPARATIVE EXAMPLE 6

The procedures of Example 3 were repeated in the same manner except that 0.2 part by weight of calcium carbonate and 0.5 part by weight of oleic acid amide were used instead of the fine spherical silica particle and the hydroxy-fatty acid glyceride in the composition of the laminated layer [layer (A)].

COMPARATIVE EXAMPLE 7

The procedures of Example 1 were repeated in the same manner except that the fine spherical silica particle was not incorporated.

COMPARATIVE EXAMPLE 8

The procedures of Example 1 were repeated in the same manner except that the hydroxy-fatty acid glyceride was not incorporated.

COMPARATIVE EXAMPLE 9

The procedures of Example 3 were repeated in the same manner except that the fine spherical silica particle was not incorporated in the composition of the laminated layer [layer (A)].

COMPARATIVE EXAMPLE 10

The procedures of Example 3 were repeated in the same manner except that the hydroxy-fatty acid glyceride was not incorporated in the composition of the laminated layer [layer (A)].

The results of the measurement and evaluation of the characteristics of the films obtained in the foregoing examples and comparative examples are summarized in Table 1.

As apparent from the results shown in Table 1, the films of the present invention obtained in Examples 1, 2 and 3 had, simultaneously, a small haze, a high gloss, a small friction coefficient, and a high aluminum vacuum deposition adhesion index. Therefore, these films had a sufficient transparency, gloss, slipperiness and adhesiveness, and the adaptability to vacuum deposition is good.

In contrast, in the film obtained in Comparative Example 1, the amount of the fine spherical silica particle was too small, and the slipperiness was poor and the adaptability to vacuum deposition was bad.

In the film obtained in Comparative Example 2, the amount of the fine spherical silica particle was too large, and the transparency, gloss, and adhesiveness were poor and the adaptability to vacuum deposition was bad.

In the film obtained in Comparative Example 3, the shape factor R of the silica was 0.0625, i.e., the silica was not spherical, and the friction coefficient was large, the adhesiveness was relatively poor and the adaptability to vacuum deposition was bad.

In the film obtained in Comparative Example 4, the amount of the hydroxy-fatty acid glyceride was too small, and the slipperiness was relatively poor and the adaptability to vacuum deposition was bad because pinholes and discharge defects of vacuum-deposited aluminum were formed.

In the film obtained in Comparative Example 5, the silica having a shape factor R of 0.0625 was used instead of the fine spherical silica particle in the composition of the laminated layer, and the friction coefficient was large, the adhesiveness was poor and the adaptability to vacuum deposition was bad.

In the film obtained in Comparative Example 6, calcium carbonate and oleic acid amide were used instead of the fine spherical silica particle and the hydroxy-fatty acid glyceride in the composition of the laminated layer, and the transparency, gloss, slipperiness, and adhesiveness were poor and the adaptability to vacuum deposition was bad.

In the film obtained in Comparative Examples 7 to 10, only one of the two additives of the present invention was incorporated, and the friction coefficient was large and the adaptability to vacuum deposition was bad.

As apparent from the foregoing description, the propylene polymer film of the present invention has an excellent transparency, gloss, slipperiness and adhesiveness as well as a good adaptability to vacuum deposition.

We claim:

1. A propylene polymer film composed of a composition comprising 100 parts by weight of a propylene polymer, 0.01 to 0.5 parts by weight of a fine spherical silica particle per 100 parts by weight of said propylene polymer and 0.3 to 5.0 parts by weight of hydroxy-fatty acid glyceride per 100 parts by weight of said propylene polymer, wherein the fine spherical silica particle has a shape factor R value in the range of from 0.0650 to

TABLE 1

| Examples and Comparative Examples | Construction of film and composition thereof Laminated layer [layer (A)] | Base layer [layer (B)] | Atomic construction ratio in surface portion of layer (B) O/C | N/C | Haze (%) | Gloss (%) | Friction coefficient static/dynamic | Al vacuum deposition adhesion index | Adaptability to vacuum deposition |
|---|---|---|---|---|---|---|---|---|---|
| Ex. 1 | — | Polypropylene<br>a. (R = 0.078, 2 μm, 0.1 part by wt.)<br>b. (0.5 part by wt.) | 0.13 | 0.01 | 2.0 | 135 | 0.44/0.36 | 5 | Good |
| Comp. Ex. 1 | — | Polypropylene<br>a. (R = 0.078, 2 μm, 0.005 part by wt.)<br>b. (5.5 part by wt.) | 0.14 | 0.01 | 1.8 | 137 | 0.98/0.88 | 5 | Poor |
| Comp. Ex. 2 | — | Polypropylene<br>a. (R = 0.078, 2 μm, 0.7 part by wt.)<br>b. (0.5 part by wt.) | 0.14 | 0.01 | 4.9 | 125 | 0.41/0.33 | 2 | Poor |
| Comp. Ex. 3 | — | Polypropylene<br>b. (0.5 part by wt.)<br>c. (AMT-Silica 200A, 0.1 part by wt.) | 0.13 | 0.01 | 2.3 | 130 | 0.60/0.54 | 4 | Poor |
| Ex. 2 | Ethylene/propylene/butene-1 copolymer<br>a. (R = 0.078, 4,5 μm, 0.25 part by wt.)<br>b. (1.5 part by wt.) | Polypropylene<br>c. (Zeolite, 0.05 part by wt.) | 0.13 | 0.01 | 2.3 | 133 | 0.39/0.28 | 5 | Good |
| Ex. 3 | Ethylene/propylene/butene-1 copolymer<br>a. (R = 0.078, 4.5 μm, 0.3 part by wt.)<br>b. (1.5 part by wt.) | Polypropylene<br>a. (R = 0.078, 2 μm, 0.02 part by wt.) | 0.13 | 0.01 | 2.2 | 135 | 0.35/0.23 | 5 | Good |
| Comp. Ex. 4 | Ethylene/propylene/butene-1 copolymer<br>a. (R = 0.078, 4,5 μm, 0.25 part by wt.)<br>b. (0.1 part by wt.) | Polypropylene<br>a. (R = 0.078, 2 μm, 0.02 part by wt.) | 0.13 | 0.01 | 2.2 | 132 | 0.83/0.70 | 5 | Poor |
| Comp. Ex. 5 | Ethylene/propylene/butene-1 copolymer<br>b. (1.5 part by wt.)<br>c. (AMT-Silica 200A, 0.3 part by wt.) | Polypropylene<br>a. (R = 0.078, 2 μm, 0.02 part by wt.) | 0.13 | 0.01 | 2.1 | 132 | 0.70/0.66 | 3 | Poor |
| Comp. Ex. 6 | Ethylene/propylene/butene-1 copolymer<br>c. (calcium carbonate, 0.2 part by wt.)<br>c. (Oleic acid amide, 0.5 part by wt.) | Polypropylene<br>a. (R = 0.078, 2 μm, 0.02 part by wt.) | 0.14 | 0.02 | 3.2 | 123 | 0.75/0.71 | 3 | Poor |
| Comp. Ex. 7 | — | Polypropylene<br>b. (0.5 part by wt.) | 0.13 | 0.01 | 1.8 | 137 | 1.00/0.89 | 4 | Poor |
| Comp. Ex. 8 | — | Polypropylene<br>a. (R = 0.078, 2 μm, 0.1 part by wt.) | 0.13 | 0.01 | 1.9 | 137 | 0.80/0.77 | 4 | Poor |
| Comp. Ex. 9 | Ethylene/propylene/butene-1 copolymer<br>b. (1.5 part by wt.) | Polypropylene<br>a. (R = 0.078, 2 μm, 0.02 part by wt.) | 0.13 | 0.01 | 2.1 | 135 | 0.95/0.88 | 5 | Poor |
| Comp. Ex. 10 | Ethylene/propylene/butene-1 copolymer<br>a. (R = 0.078, 4,5 μm, 0.3 part by wt.) | Polypropylene<br>a. (R = 0.078, 2 μm, 0.02 part by wt.) | 0.13 | 0.01 | 2.1 | 134 | 0.80/0.78 | 5 | Poor |

Note
1) The additives are as described below.
a. a fine spherical silica particle (shape factor R, average diameter in μm, amount incorporated)
b. a hydroxy-fatty acid glyceride (amount incorporated)
c. other additives (substance name, amount incorporated)

0.0795, wherein R is expressed by the following formula:

$$R = A/P^2$$

wherein A represents the projection cross-sectional area of the fine spherical silica particle and P represents the circumferential length of the projection cross-section of the fine spherical silica particle.

2. A propylene polymer film as set forth in claim 1, wherein the propylene polymer is at least one member selected from the group consisting of an ethylene/propylene copolymer, an ethylene/propylene/butene-1 copolymer and a propylene/butene-1 copolymer.

3. A propylene polymer film comprising a laminate film including at least one layer composed of a composition comprising 100 parts by weight of a propylene polymer, 0.01 to 0.5 parts by weight of a fine spherical silica particle per 100 parts by weight of said propylene polymer, and 0.3 to 5.0 parts by weight of hydroxy-fatty acid glyceride per 100 parts by weight of said propylene polymer; and at least one layer composed of another composition comprising a propylene polymer, wherein the fine spherical silica particle has a shape factor R value in the range of from 0.0650 to 0.0795, wherein R is expressed by the following formula:

$$R = A/P^2$$

wherein A represents the projection cross-sectional area of the fine spherical silica particle and P represents the circumferential length of the projection cross-section of the fine spherical silica particle.

4. A propylene polymer film as set forth in claim 3, wherein the propylene polymer in the composition comprising the fine spherical silica particle and the hydroxy-fatty acid glyceride is at least one member selected from the group consisting of an ethylene/propylene copolymer, an ethylene/propylene/butene-1 copolymer and a propylene/butene-1 copolymer.

5. A propylene polymer film as set forth in claim 1, wherein the average diameter of the fine spherical silica particle is 1.0 to 7.0 μm.

6. A propylene polymer film as set forth in claim 3, wherein the average diameter of the fine spherical silica particle is 1.0 to 7.0 μm.

7. A propylene polymer film as set forth in claim 1, wherein the fine spherical silica particle has a silicon dioxide content of not less than 70% by weight and the hydroxy-fatty acid glyceride is glyceryl tri-12-hydroxystearate.

8. A propylene polymer film as set forth in claim 3, wherein the fine spherical silica particle has a silicon dioxide content of not less than 70% by weight and the hydroxy-fatty acid glyceride is glyceryl tri-12-hydroxystearate.

9. A propylene polymer film as set forth in claim 1, wherein the propylene polymer is selected from the group consisting of an ethylene/propylene copolymer having an ethylene content of 1 to 8% by weight, an ethylene/propylene/butene-1 copolymer having an ethylene content of 0.5 to 5% by weight and a butene-1 content of 3 to 25% by weight, a propylene/butene-1 copolymer having a butene-1 content of 3 to 25% by weight, and a mixture of an ethylene/propylene copolymer and a propylene/butene-1 copolymer having an ethylene content of 0.5 to 5% by weight and a butene-1 content of 2 to 15% by weight.

10. A propylene polymer film as set forth in claim 3, wherein the propylene polymer is selected from the group consisting of an ethylene/propylene copolymer having an ethylene content of 1 to 8% by weight, an ethylene/propylene/butene-1 copolymer having an ethylene content of 0.5 to 5% by weight and a butene-1 content of 3 to 25% by weight, a propylene/butene-1 copolymer having a butene-1 content of 3 to 25% by weight, and a mixture of an ethylene/propylene copolymer and a propylene/butene-1 copolymer having an ethylene content of 0.5 to 5% by weight and a butene-1 content of 2 to 15% by weight.

11. A propylene polymer film as set forth in claim 9, wherein the propylene content is at least 80% by weight.

12. A propylene polymer film as set forth in claim 10, wherein the propylene content is at least 80% by weight.

13. A propylene polymer film as set forth in claim 1, wherein the fine spherical silica particle has a silicon dioxide content of at least 80% by weight.

14. A propylene polymer film as set forth in claim 3, wherein the fine spherical silica particle has a silicon dioxide content of at least 80% by weight.

15. A propylene polymer film as set forth in claim 1, wherein the hydroxy-fatty acid glyceride is a hydroxylated product of a mono-, di- or tri-glyceride of a fatty acid having 8 to 22 carbon atoms.

16. A propylene polymer film as set forth in claim 3, wherein the hydroxy-fatty acid glyceride is a hydroxylated product of a mono-, di- or tri-glyceride of a fatty acid having 8 to 22 carbon atoms.

17. A propylene polymer film as set forth in claim 1, wherein the hydroxy-fatty acid glyceride is one wherein a hydrogen atom bonded to the twelfth carbon atom counted from the carbonyl carbon atom is substituted by a hydroxy group.

18. A propylene polymer film as set forth in claim 3, wherein the hydroxy-fatty acid glyceride is one wherein a hydrogen atom bonded to the twelfth carbon atom counted from the carbonyl carbon atom is substituted by a hydroxy group.

19. A propylene polymer film as set forth in claim 1, wherein the fine spherical silica particle is present in an amount of 0.02 to 0.35 parts by weight per 100 parts by weight of the propylene polymer and the hydroxy-fatty acid glyceride is present in an amount of 0.5 to 3.0 parts by weight per 100 parts by weight of the propylene polymer.

20. A propylene polymer film as set forth in claim 3, wherein the fine spherical silica particle is present in an amount of 0.02 to 0.35 parts by weight per 100 parts by weight of the propylene polymer and the hydroxy-fatty acid glyceride is present in an amount of 0.5 to 3.0 parts by weight per 100 parts by weight of the propylene polymer.

* * * * *